(12) United States Patent
Hirano et al.

(10) Patent No.: US 10,984,525 B2
(45) Date of Patent: Apr. 20, 2021

(54) PATTERN INSPECTION METHOD AND PATTERN INSPECTION APPARATUS

(71) Applicant: NuFlare Technology, Inc., Yokohama (JP)

(72) Inventors: Ryoichi Hirano, Setagaya-ku (JP); Hideo Tsuchiya, Setagaya-ku (JP); Masataka Shiratsuchi, Kawasaki (JP); Hideaki Hashimoto, Yokohama (JP); Riki Ogawa, Kawasaki (JP)

(73) Assignee: NuFlare Technology, Inc., Yokohama (JP)

( * ) Notice: Subject to any disclaimer, the term of this patent is extended or adjusted under 35 U.S.C. 154(b) by 68 days.

(21) Appl. No.: 16/271,909

(22) Filed: Feb. 11, 2019

(65) Prior Publication Data

US 2019/0279348 A1    Sep. 12, 2019

(30) Foreign Application Priority Data

Mar. 6, 2018 (JP) .............................. JP2018-040165

(51) Int. Cl.
  *G06T 7/00* (2017.01)
  *G01N 21/956* (2006.01)
  *G06T 5/50* (2006.01)

(52) U.S. Cl.
  CPC ....... *G06T 7/001* (2013.01); *G01N 21/95607* (2013.01); *G06T 5/50* (2013.01);
  (Continued)

(58) Field of Classification Search
  CPC ........... G01N 21/9501; G01N 23/2251; G01N 21/8803; G01N 21/956; G01N 2223/6116;
  (Continued)

(56) References Cited

U.S. PATENT DOCUMENTS 5,621,811 A * 4/1997 Roder .................. G01N 23/044
                                                      382/147
5,699,447 A * 12/1997 Alumot .................. G01N 21/94
                                                      348/126

(Continued)

FOREIGN PATENT DOCUMENTS

JP     2005-526239    9/2005
WO    WO 03/073476 A2    9/2003

*Primary Examiner* — Santiago Garcia
(74) *Attorney, Agent, or Firm* — Oblon, McClelland, Maier & Neustadt, L.L.P.

(57) ABSTRACT

Provided is a pattern inspection method including: irradiating a substrate with an electron beam, a pattern being formed on the substrate; acquiring an inspection image as a secondary electron image of the pattern; setting a pixel value equal to or less than a first threshold value minus a half of a predetermined detection width of the inspection image and a pixel value equal to or more than the first threshold value plus a half of the predetermined detection width of the inspection image to unprocessed; acquiring a difference image between the inspection image having the pixel value having less than the first threshold value minus the half of the predetermined detection width and the pixel value having more of the first threshold value plus the half of the predetermined detection width being set to unprocessed and a reference image of the inspection image; and performing inspection on the basis of the difference image.

15 Claims, 7 Drawing Sheets

(52) U.S. Cl.
CPC .............. *G01N 2021/95615* (2013.01); *G06T 2207/30148* (2013.01)

(58) Field of Classification Search
CPC .. G01N 2021/8893; G01N 2021/95615; G06T 2207/30148; G06T 7/001; G06T 7/0004; G06T 2207/10061; G06T 2207/20224; H01J 2237/2817; H01J 37/222; H01J 37/244; H01J 2237/082; H01J 37/06; H01J 37/285; H01J 37/292; H01J 37/28; H01J 37/265; G06K 9/036; G06K 2209/19; G06K 9/00; H01L 2924/00; H01L 22/12; H01L 22/20; G01R 31/311
USPC ........ 382/144, 145, 148, 149, 151; 250/310, 250/311
See application file for complete search history.

(56) References Cited

U.S. PATENT DOCUMENTS

| | | | | |
|---|---|---|---|---|
| 6,122,009 A | * | 9/2000 | Ueda | H04N 1/00204 348/335 |
| 6,947,587 B1 | * | 9/2005 | Maeda | G01N 21/95607 382/144 |
| 8,194,969 B2 | * | 6/2012 | Shimura | G01N 21/8803 382/144 |
| 2002/0036264 A1 | * | 3/2002 | Nakasuji | G01N 23/225 250/306 |
| 2002/0130262 A1 | * | 9/2002 | Nakasuji | H01J 37/185 250/311 |
| 2006/0222235 A1 | * | 10/2006 | Kanegae | G06K 9/00 382/145 |
| 2007/0109557 A1 | * | 5/2007 | Saito | H01J 37/20 356/602 |
| 2007/0194229 A1 | * | 8/2007 | Okuda | H01J 37/292 250/310 |
| 2010/0239156 A1 | * | 9/2010 | Shimura | G01N 21/8803 382/145 |
| 2010/0245632 A1 | * | 9/2010 | Suzuki | H04N 5/357 348/241 |
| 2011/0182496 A1 | * | 7/2011 | Sakai | G06T 7/001 382/145 |
| 2011/0278452 A1 | * | 11/2011 | Nozoe | H01J 37/28 250/307 |
| 2014/0291515 A1 | * | 10/2014 | Tajima | H01J 37/244 250/310 |

* cited by examiner

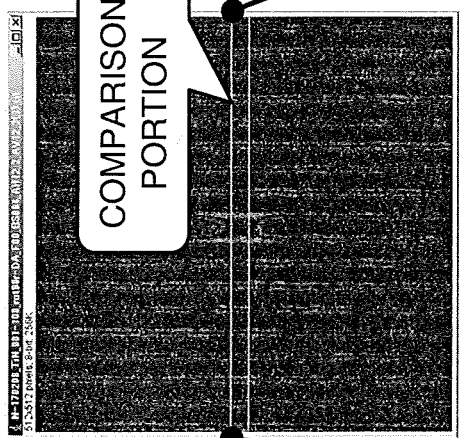
Fig.5A INSPECTION IMAGE
Fig.5B REFERENCE IMAGE
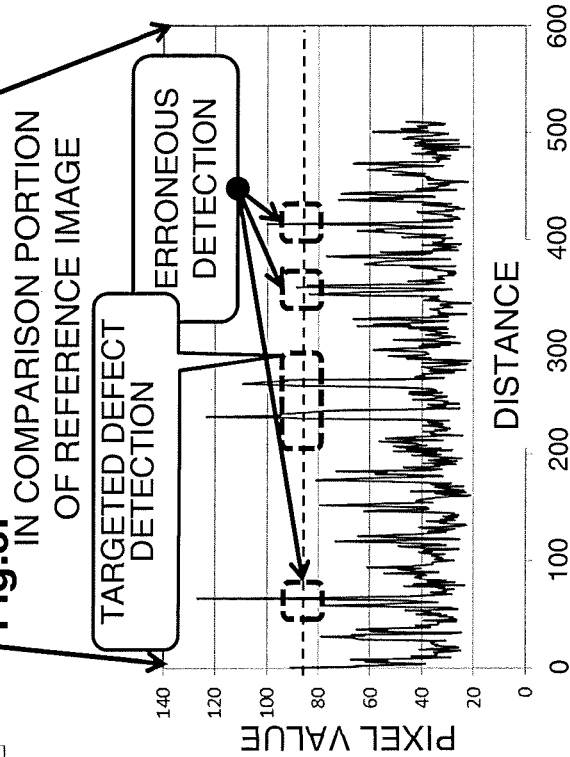
Fig.5C DIFFERENCE IMAGE
Fig.5F PIXEL VALUE IN COMPARISON PORTION OF REFERENCE IMAGE
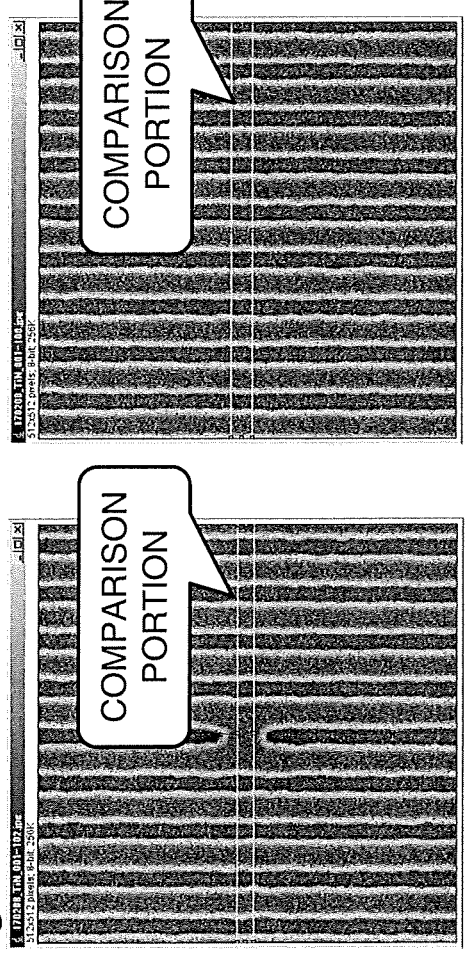
Fig.5D PIXEL VALUE IN COMPARISON PORTION OF INSPECTION IMAGE
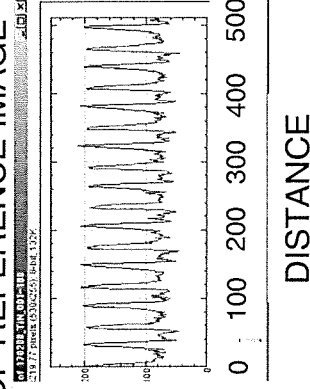
Fig.5E PIXEL VALUE IN COMPARISON PORTION OF REFERENCE IMAGE
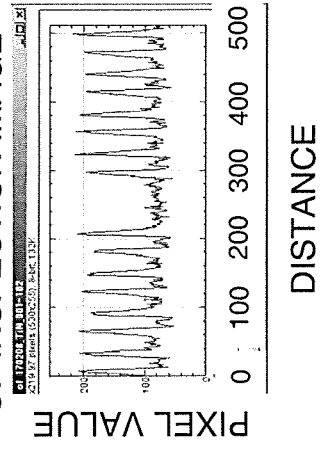

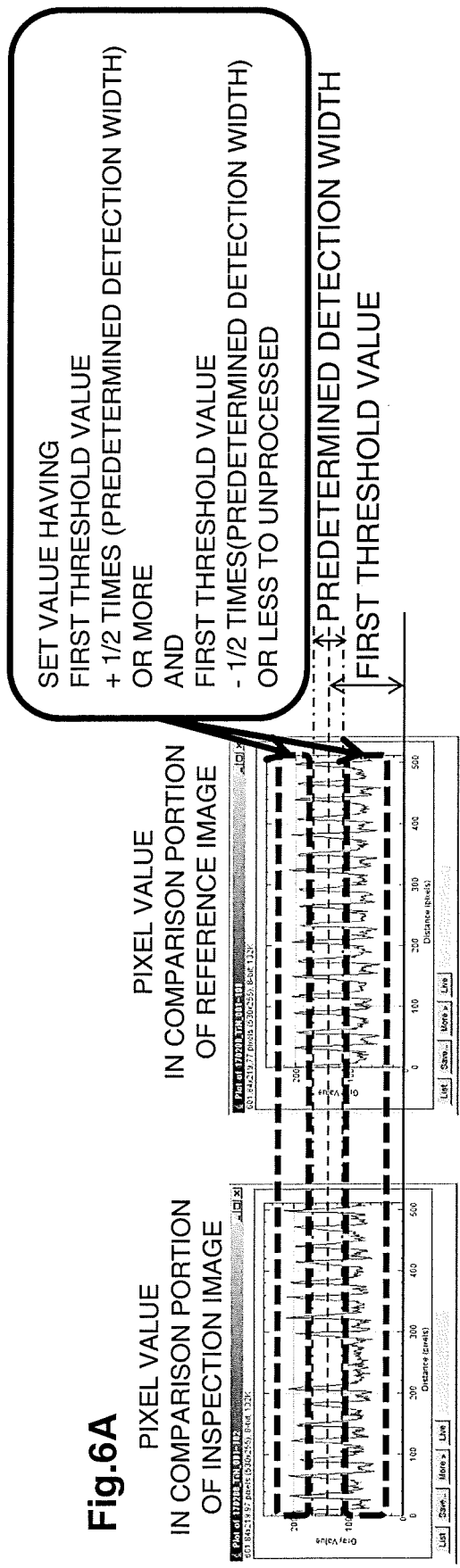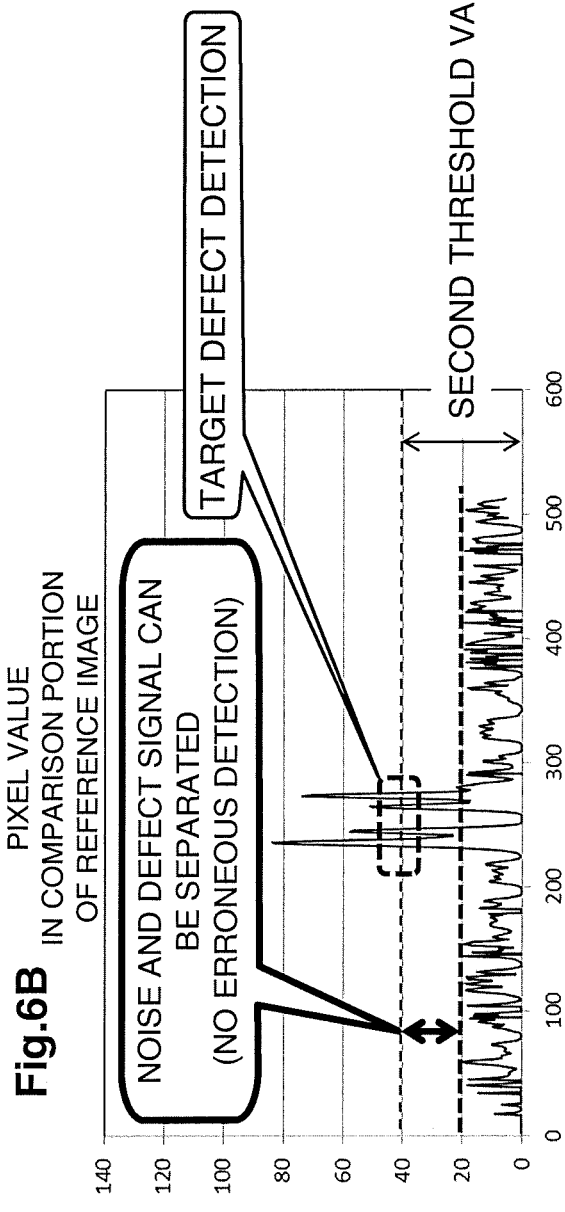

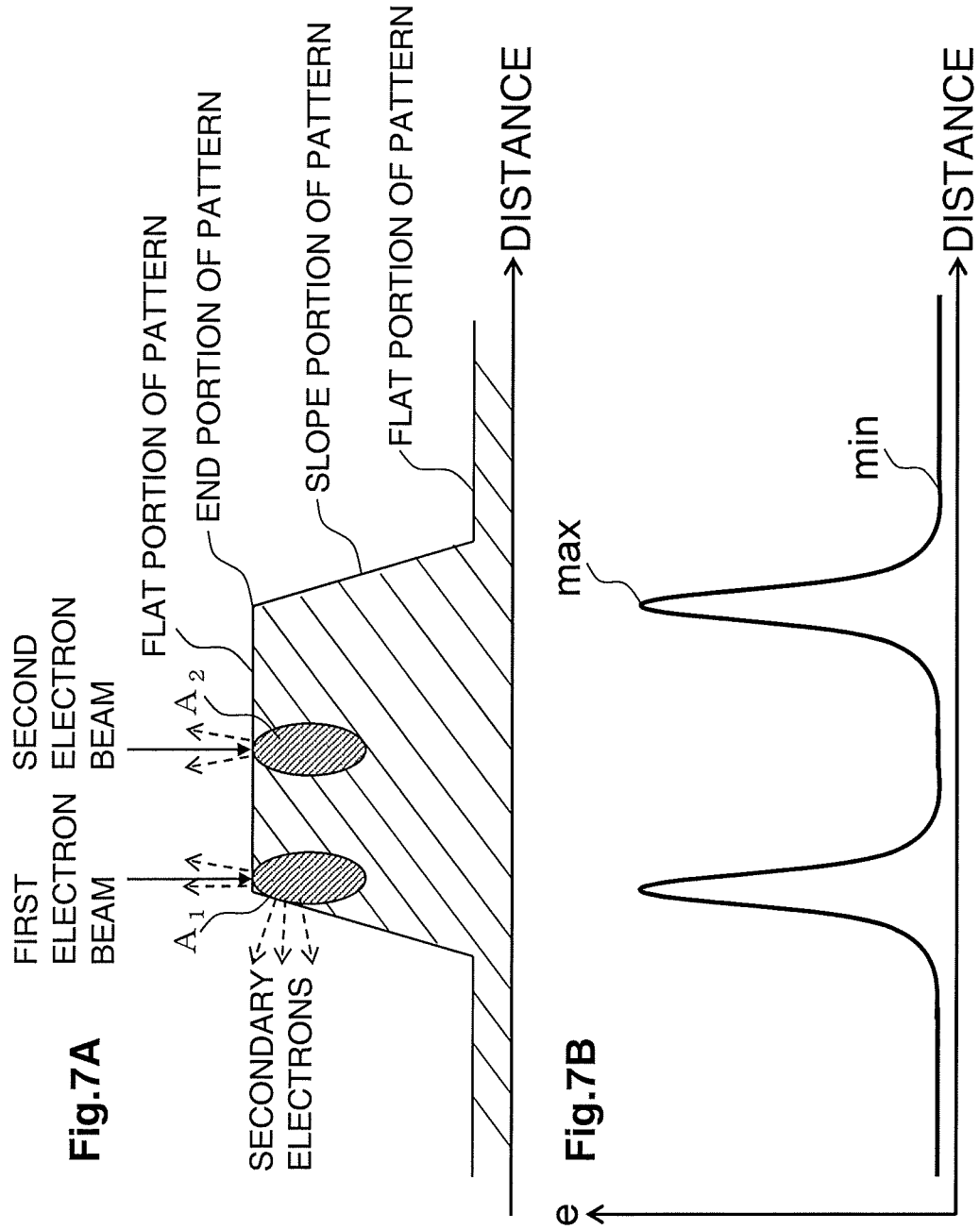

PATTERN INSPECTION METHOD AND PATTERN INSPECTION APPARATUS

CROSS-REFERENCE TO RELATED APPLICATION

This application is based upon and claims the benefit of priority from Japanese Patent Applications No. 2018-040165, filed on Mar. 6, 2018, the entire contents of which are incorporated herein by reference.

FIELD OF THE INVENTION

The present invention relates to a pattern inspection method and a pattern inspection apparatus.

BACKGROUND OF THE INVENTION

In recent years, with the increase in degree of integration and the large capacity of large scale integrated circuits (LSIs), the circuit line width required for semiconductor elements has been narrower. These semiconductor elements are manufactured by using an original image pattern (also referred to as a mask or a reticle and, hereinafter, collectively referred to as a mask) on which a circuit pattern is formed and by exposing and transferring the pattern onto a wafer by a reduction projection exposure apparatus called a so-called stepper to form a circuit.

And, for manufacturing LSIs requiring a large production cost, the improvement of yields is indispensable. However, as represented by 1-gigabit class random access memory (DRAM), patterns constituting the LSIs are on the order of submicrometer to nanometer. In recent years, with the miniaturization of sizes of LSI patterns formed on a semiconductor wafer, the size to be detected as a pattern defect becomes extremely small. Therefore, it is necessary to improve the accuracy of a pattern inspection apparatus for inspecting defects of ultrafine patterns transferred onto the semiconductor wafer. Besides, as one of the major factors of decreasing the yields, there may be mentioned a pattern defect of a mask used for exposing and transferring an ultrafine pattern on a semiconductor wafer by a photolithography technique. Therefore, it is necessary to improve the accuracy of a pattern inspection apparatus for inspecting defects of a transfer mask used for manufacturing LSIs.

As an inspection method, there is known a method of performing inspection by comparing an optical image obtained by imaging a pattern formed on a sample such as a semiconductor wafer or a lithography mask with a predetermined magnification by using an enlargement optical system with an optical image obtained by imaging a design data or an identical pattern on the sample. For example, as a pattern inspection method, there are "die-to-die inspection" of comparing optical image data obtained by imaging identical patterns at different places on the same mask and "die-to-database inspection" of inputting, to an inspection apparatus, a drawing data (design pattern data) obtained by converting a CAD data in which a pattern is designed into a device input format to be input by a drawing device at the time of drawing a pattern on a mask, generating a design image data (reference image) on the basis of the drawing data, and comparing an optical image as a measurement data obtained by imaging the pattern with the design image data. In the inspection method in such an inspection apparatus, the inspection target substrate is mounted on a stage, and while light flux scans the sample by the movement of the stage, the inspection is performed. The inspection target substrate is irradiated with the light flux by a light source and an illumination optical system. Light transmitted through or reflected from the inspection target substrate is imaged on a sensor via an optical system. The image captured by the sensor is transmitted as a measurement data to a comparison circuit. In the comparison circuit, after the images are aligned with each other, the measurement data and a reference data are compared according to an appropriate algorithm, and when the measurement data and the reference data do not match, it is determined that there is a pattern defect.

In the above-described pattern inspection apparatus, an optical image is acquired by irradiating the inspection target substrate with a laser beam and capturing a transmission image or a reflection image thereof. On the other hand, there has been developed an inspection apparatus that irradiates the inspection target substrate with a multi-beam including a plurality of electron beams in an array arrangement in which a plurality of rows of beams are arrayed at an equal pitch on a straight line are aligned, detects secondary electrons corresponding to the respective beams emitted from the inspection target substrate to acquire a pattern image. In a pattern inspection apparatus using an electron beam including such multi-beams, secondary electrons are detected by scanning each small region of the inspection target substrate.

SUMMARY OF THE INVENTION

According to an aspect of the invention, there is provided a pattern inspection method including: irradiating a substrate with an electron beam, a pattern being formed on the substrate; acquiring an inspection image as a secondary electron image of the pattern; setting a pixel value equal to or less than a first threshold value minus a half of a predetermined detection width of the inspection image and a pixel value equal to or more than the first threshold value plus a half of the predetermined detection width of the inspection image to unprocessed; acquiring a difference image between the inspection image having the pixel value equal to or less than the first threshold value minus the half of the predetermined detection width and the pixel value equal to or more than the first threshold value plus the half of the predetermined detection width being set to unprocessed and a reference image of the inspection image; and performing inspection on the basis of the difference image.

According to an aspect of the invention, there is provided a pattern inspection apparatus including: an irradiation unit irradiating a substrate with an electron beam, a pattern being formed on the substrate; an image acquisition mechanism acquiring an inspection image as a secondary electron image of the pattern; a pixel value processing circuit setting a pixel value equal to or less than a first threshold value minus a half of a predetermined detection width of the inspection image and a pixel value equal to or more than the first threshold value plus a half of the predetermined detection width of the inspection image to unprocessed; acquiring a difference image between the inspection image having the pixel value having less than the first threshold value minus the half of the predetermined detection width and the pixel value having more of the first threshold value plus the half of the predetermined detection width being set to unprocessed and a reference image of the inspection image; and a difference image inspection circuit performing inspection on the basis of the difference image.

BRIEF DESCRIPTION OF THE DRAWINGS

FIGS. 5A to 5F are schematic diagrams illustrating functions and effects of a pattern inspection method according to Comparative Example;

FIGS. 6A and 6B are schematic diagrams illustrating functions and effects of the pattern inspection method according to the embodiment; and FIGS. 7A and 7B are schematic views of secondary electrons emitted from a pattern.

DETAILED DESCRIPTION OF THE EMBODIMENTS

Hereinafter, embodiments of the invention will be described with reference to the drawings.

Embodiment

A pattern inspection method according to the present embodiment including: irradiating a substrate with an electron beam, a pattern being formed on the substrate; acquiring an inspection image as a secondary electron image of the pattern; setting a pixel value equal to or less than a first threshold value minus a half of a predetermined detection width of the inspection image and a pixel value equal to or more than the first threshold value plus a half of the predetermined detection width of the inspection image to unprocessed; acquiring a difference image between the inspection image having the pixel value equal to or less than the first threshold value minus the half of the predetermined detection width and the pixel value equal to or more than the first threshold value plus the half of the predetermined detection width being set to unprocessed and a reference image of the inspection image; and performing inspection on the basis of the difference image.

A pattern inspection apparatus according to the present embodiment includes: an irradiation unit irradiating a substrate with an electron beam, a pattern being formed on the substrate; an image acquisition mechanism acquiring an inspection image as a secondary electron image of the pattern; a pixel value processing circuit setting a pixel value equal to or less than a first threshold value minus a half of a predetermined detection width of the inspection image and a pixel value equal to or more than the first threshold value plus a half of the predetermined detection width of the inspection image to unprocessed; acquiring a difference image between the inspection image having the pixel value equal to or less than the first threshold value minus the half of the predetermined detection width and the pixel value equal to or more than the first threshold value plus the half of the predetermined detection width being set to unprocessed and a reference image of the inspection image; and a difference image inspection circuit performing inspection on the basis of the difference image.

Figure 1:
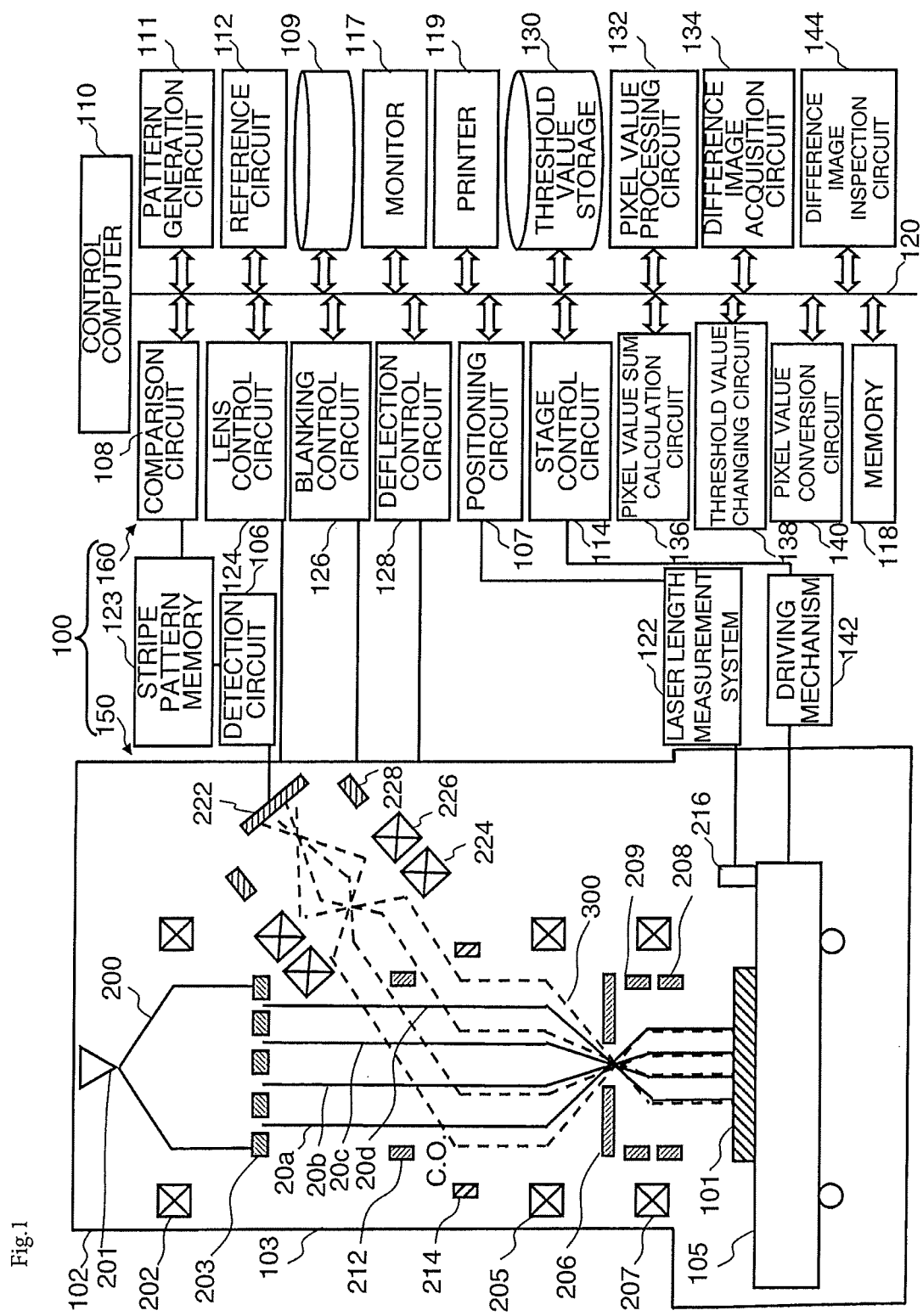
FIG. 1 is a configuration diagram illustrating a configuration of a pattern inspection apparatus according to an embodiment.

FIG. 1 is a configuration diagram illustrating a configuration of a pattern inspection apparatus according to this embodiment. In FIG. 1, an inspection apparatus 100 which inspects a pattern formed on a substrate is an example of a charged particle beam inspection apparatus. An electron beam is an example of a charged particle beam. The inspection apparatus 100 includes an electro-optical image acquisition mechanism (image acquisition mechanism) 150 and a control system circuit 160 (control unit). The electro-optical image acquisition mechanism 150 includes an electron beam column 102 (electron lens barrel), an inspection room 103, a detection circuit 106, a stripe pattern memory 123, a driving mechanism 142, and a laser length measurement system 122. In the electron beam column 102, an electron gun (an example of an irradiation unit) 201, an illumination lens 202, a shaping aperture array substrate 203, a reduction lens 205, a limited aperture substrate 206, an objective lens 207, a main deflector 208, a sub deflector 209, a collective blanking deflector 212, a beam separator 214, projection lenses 224 and 226, a deflector 228, and a multi-detector 222 are arranged.

In the inspection room 103, an XY stage 105 movable on at least the XY plane is disposed. On the XY stage 105, a substrate 101 on which a chip pattern as an inspection target is formed is disposed. The substrate 101 includes a semiconductor substrate such as an exposure mask or a silicon wafer. The substrate 101 is disposed on the XY stage 105 with, for example, a pattern formation surface facing upward. In addition, a mirror 216 for reflecting the laser light for measuring the laser length emitted from the laser length measurement system 122 disposed outside the inspection room 103 is disposed on the XY stage 105. The multi-detector 222 is connected to the detection circuit 106 outside the electron beam column 102. The detection circuit 106 is connected to the stripe pattern memory 123.

In the control system circuit 160, a control computer 110 which is a computer is connected to a positioning circuit 107, a comparison circuit 108, a pattern generation circuit 111, a reference circuit 112, a stage control circuit 114, a lens control circuit 124, a blanking control circuit 126, a deflection control circuit 128, a threshold value storage 130, a pixel value processing circuit 132, a difference image acquisition circuit 134, a pixel value sum calculation circuit 136, a threshold value changing circuit 138, a pixel value conversion circuit 140, a difference image inspection circuit 144, a memory device 109 such as a magnetic disk device, a monitor 117, a memory 118, and a printer 119 via a bus 120. In addition, the stripe pattern memory 123 is connected to the comparison circuit 108. In addition, the XY stage 105 is driven by the driving mechanism 142 under the control of the stage control circuit 114. In the driving mechanism 142, for example, a driving system such as a three-axis (X-Y-θ) motor driven in the X direction, the Y direction, and the θ direction is configured, and the XY stage 105 is movable. For these X motors, Y motors, and θ motors (not illustrated), for example, step motors may be used. The XY stage 105 is movable in the horizontal direction and the rotational direction by the motors of the X, Y, and θ axes. The moving position of the XY stage 105 is measured by the laser length measurement system 122 and supplied to the positioning circuit 107. The laser length measurement system 122 measures the position of the XY stage 105 by the principle of the laser interference method by receiving the reflected light from the mirror 216.

A high voltage power supply circuit (not illustrated) is connected to the electron gun 201. By applying an acceleration voltage from the high voltage power supply circuit between a filament (not illustrated) and a lead electrode in the electron gun 201 and applying a voltage of a predetermined lead electrode and heating a cathode (filament) at a predetermined temperature, a group of electrons emitted from the cathode are accelerated and emitted as an electron beam. For example, electromagnetic lenses are used for the illumination lens 202, the reduction lens 205, the objective lens 207, and the projection lenses 224 and 226, and all these lenses are controlled by the lens control circuit 124. In addition, the beam separator 214 is also controlled by the lens control circuit 124. Each of the collective blanking deflector 212 and the deflector 228 is configured with electrode groups having at least two poles and is controlled by the blanking control circuit 126. Each of the main deflector 208 and the sub deflector 209 is configured with electrode groups having at least four poles and is controlled by the deflection control circuit 128.

In a case where the substrate 101 is a semiconductor wafer on which a plurality of chip (die) patterns are formed, the pattern data of such a chip (die) pattern is input from the outside of the inspection apparatus 100 and stored in the memory device 109. In a case where the substrate 101 is an exposure mask, the design pattern data which is a basis for forming a mask pattern on the exposure mask is input from the outside of the inspection apparatus 100 and stored in the memory device 109.

Herein, in FIG. 1, the configuration necessary for explaining the first embodiment is described. In general, the inspection apparatus 100 may include configurations other than the necessary configuration.

Figure 2:
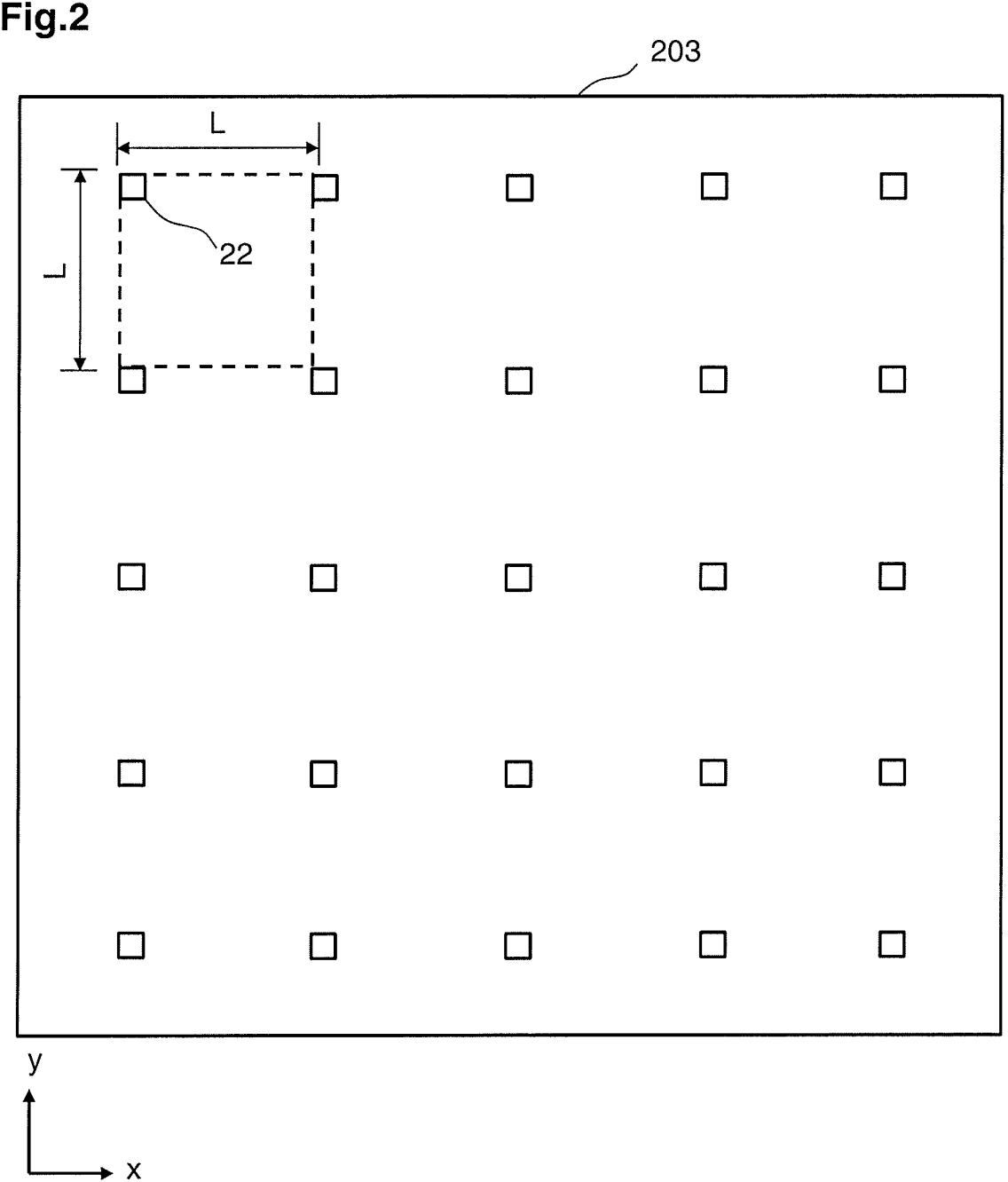
FIG. 2 is a conceptual diagram illustrating a configuration of a shaping aperture array member according to the embodiment.

FIG. 2 is a conceptual diagram illustrating the configuration of the shaping aperture array member according to the first embodiment. In FIG. 2, in the shaping aperture array substrate 203, N×N' (N is an integer of 2 or more and N' is an integer of 1 or more) holes (apertures) 22 having a two-dimensional shape (matrix shape) of N columns (horizontal, x direction)×N' rows (vertical, y direction) are formed at a predetermined arrangement pitch L in the x and y directions (x: first direction, y: second direction). In addition, in a case where the reduction magnification of the multi-beam is set to "a" times (when the substrate 101 is irradiated with the multi-beam of which diameter is reduced to 1/a) and the inter-beam pitch of the multi-beam in the x and y directions on the substrate 101 is set to p, the arrangement pitch L is L=(a×p). In the example of FIG. 2, 5×5 multi-beam forming holes 22 of N=5 and N'=5 are formed. Next, the operations of the electro-optical image acquisition mechanism 150 in the inspection apparatus 100 will be described.

Figure 3:
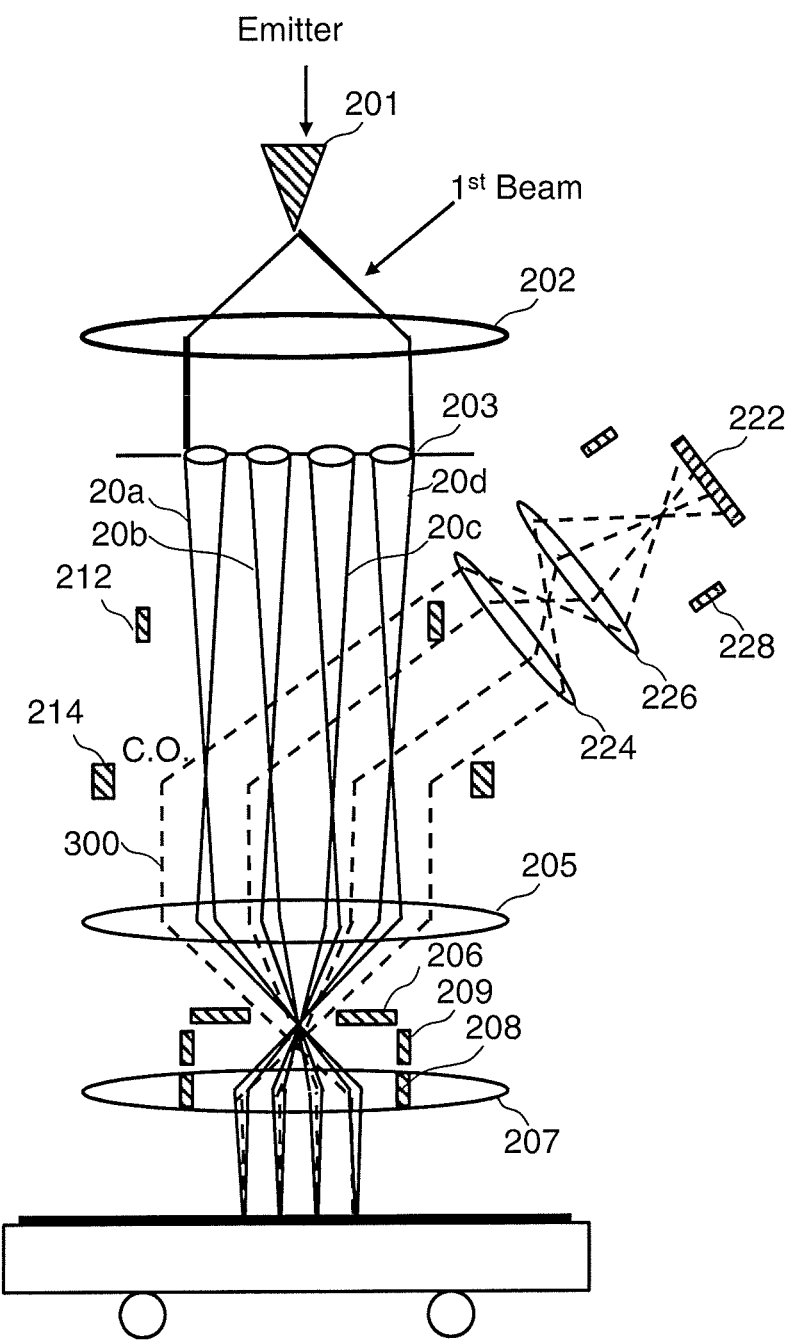
FIG. 3 is a view illustrating a beam trajectory in the inspection apparatus according to the embodiment.

FIG. 3 is a view illustrating a beam trajectory in the inspection apparatus according to the first embodiment. The entire shaping aperture array substrate 203 is illuminated substantially vertically with the electron beam 200 emitted from the electron gun 201 (emission source) by the illumination lens 202. As illustrated in FIG. 2, a plurality of rectangular holes 22 (apertures) are formed in the shaping aperture array substrate 203, and a region including all of the plurality of holes 22 is illuminated with the electron beam 200. Each portion of the electron beams 200 irradiated to the positions of the plurality of holes 22 passes through the plurality of holes 22 of the shaping aperture array substrate 203, so that a plurality of electron beams (multi-beams) (a plurality of electron beams) 20*a* to 20*d* (solid lines in FIGS. 1 and 3) having, for example, a rectangular or circular shape are formed.

After that, the formed multi-beams 20*a* to 20*d* form a crossover (C.O.), pass through the beam separator 214 disposed at the crossover position of the multi-beams 20. After that, the multi-beams are reduced by the reduction lens 205 and proceed toward the center hole formed in the limited aperture substrate 206. Herein, in a case where the entire multi-beams 20*a* to 20*d* are collectively deflected by the collective blanking deflector 212 disposed between the shaping aperture array substrate 203 and the reduction lens 205, the entire deflected multi-beams 20*a* to 20*d* deviate from the center hole of the limited aperture substrate 206 and are shielded by the limited aperture substrate 206. On the other hand, the entire multi-beams 20*a* to 20*d* not deflected by the collective blanking deflector 212 pass through the center hole of the limited aperture substrate 206 as illustrated in FIG. 1. Blanking control is performed by turning on/off the collective blanking deflector 212, and beam on/off is collectively controlled. In this manner, the limited aperture substrate 206 shields the entire multi-beams 20*a* to 20*d* deflected so that the beam is turned off by the collective blanking deflector 212. Then, the multi-beams 20*a* to 20*d* are formed by the group of beams, formed between the beam-on state and the beam-off state, that have passed through the limited aperture substrate 206. The multi-beams 20*a* to 20*d* that have passed through the limited aperture substrate 206 are focused by the objective lens 207 and become a pattern image (beam diameter) with a desired reduction ratio. By the main deflector 208 and the sub deflector 209, the entire multi-beams 20 that have passed through the limited aperture substrate 206 are collectively deflected in the same direction and irradiated to the respective irradiation positions on the substrate 101 of the respective beams. In such a case, the main deflector 208 collectively deflects the entire multi-beams 20 so that the reference position of the unit inspection region described later to be scanned by each beam is irradiated and also perform tracking deflection so as to track the movement of the XY stage 105. Then, the sub deflector 209 collectively deflects the entire multi-beams 20 so that each beam scans N×N' sub-regions (grid 29 described later) in the corresponding unit inspection region. Ideally, the multi-beams 20 irradiated at a time are aligned at a pitch obtained by multiplying the arrangement pitch L (=ap) of the plurality of holes 22 of the shaping aperture array substrate 203 by the above-described desired reduction ratio (1/a). In this manner, the electron beam column 102 irradiates the substrate 101 with N×N' multi-beams 20 having a two-dimensional shape at a time. Due to irradiation of the multi-beam 20 at a desired position on the substrate 101, a flux (multi-secondary electrons 300) (refer to dotted lines in FIGS. 1 and 3) of secondary electrons corresponding to each beam of the multi-beam 20 from the substrate 101 is emitted.

The multi-secondary electrons 300 emitted from the substrate 101 are refracted to the center side of the multi-secondary electrons 300 by the objective lens 207 and proceed toward the center hole formed in the limited aperture substrate 206. The multi-secondary electrons 300 that have passed through the limited aperture substrate 206 are refracted substantially parallel to the optical axis by the reduction lens 205 and proceed toward the beam separator 214.

Herein, the beam separator 214 generates an electric field and a magnetic field in directions perpendicular to each other on a plane perpendicular to the proceeding direction (optical axis) of the multi-beam 20. The electric field exerts a force in the same direction regardless of the proceeding direction of electrons. In contrast, the magnetic field exerts a force according to the Fleming's left-hand rule. For this reason, it is possible to change the direction of the force being exerted on the electrons depending on the entering direction of the electrons. In the multi-beams 20 (primary electron beams) entering the beam separator 214 from the upper side, the force by the electric field and the force by the magnetic field cancel each other, so that the multi-beams 20 proceed straight downward. In contrast, in the multi-secondary electrons 300 entering the beam separator 214 from the lower side, the force by the electric field and the force by the magnetic field are exerted in the same direction, so that the multi-secondary electrons 300 are bent obliquely upward.

The multi-secondary electrons 300 bent obliquely upward are projected onto the multi-detector 222 while being refracted by the projection lenses 224 and 226. The multi-detector 222 detects the projected multi-secondary electrons 300. The multi-detector 222 includes a diode-type two-dimensional sensor (not illustrated). Then, at the position of the diode-type two-dimensional sensor corresponding to each beam of the multi-beam 20, each secondary electron of the multi-secondary electrons 300 collides with the diode-type two-dimensional sensor to generate electrons, and a secondary electron image data is generated for each pixel described later. In a case where the multi-detector 222 does not detect the multi-secondary electrons 300, the multi-secondary electrons 300 may be blanking-deflected by the deflector 228, so that the multi-secondary electrons 300 do not reach the light receiving surface.

Figure 4:
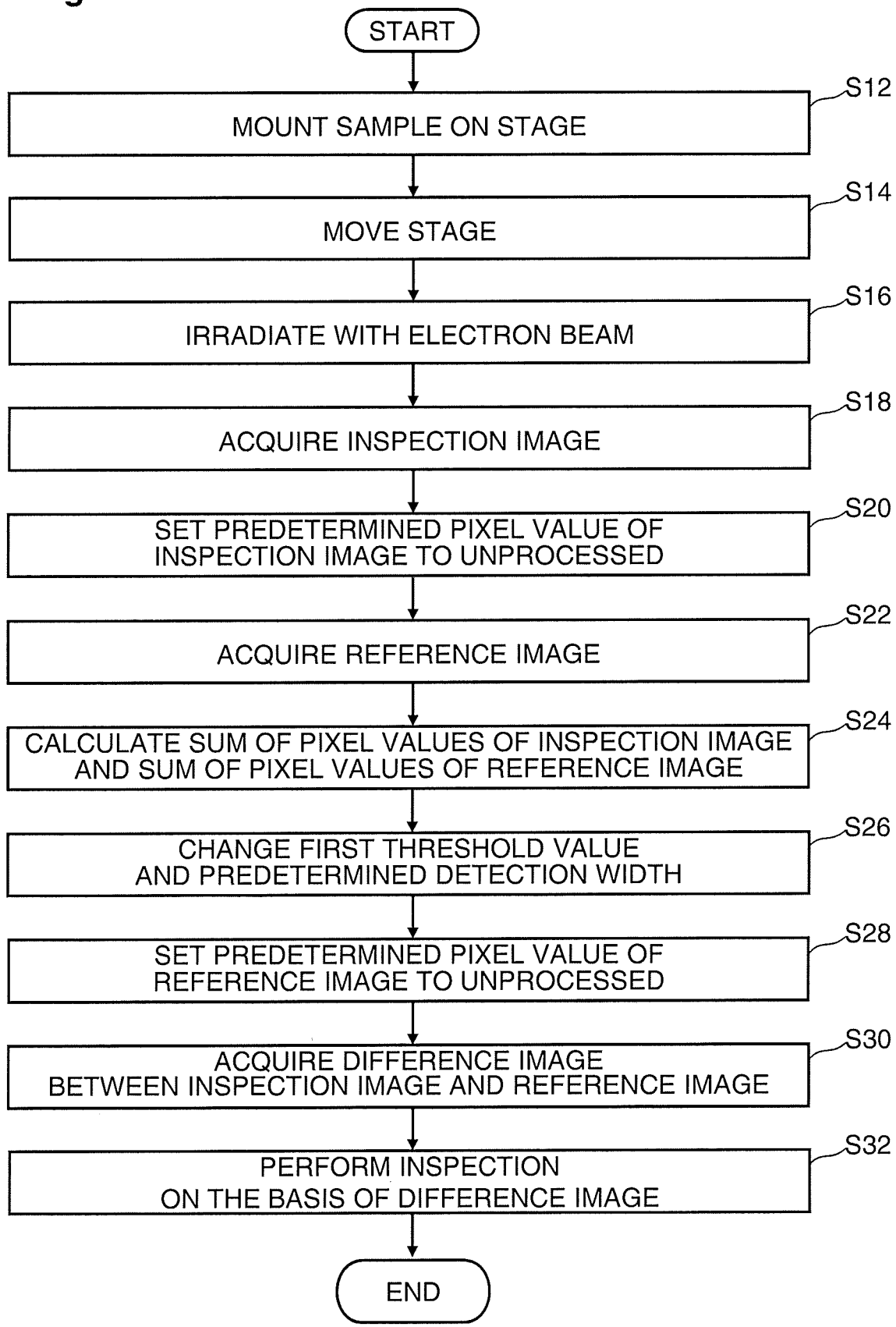
FIG. 4 is a flowchart of a pattern inspection method according to the embodiment.

FIG. 4 is a flowchart of a pattern inspection method according to the embodiment.

First, the substrate 101 on which a pattern is formed as an inspection target is mounted on the XY stage 105 (S12).

Next, the XY stage 105 is moved in the X direction, the opposite direction to the X direction, the Y direction, or the opposite direction to the Y direction (S14).

Next, the substrate 101 is irradiated with a multi-beam including a plurality of electron beams (S16).

Next, an inspection image which is a secondary electron image generated from the pattern is acquired (S18).

Next, by using the pixel value processing circuit 132, pixel values equal to or less than a first threshold value minus a half of a predetermined detection width, that is, (first threshold value−½ times (predetermined detection width)) and pixel values equal to or more than the first threshold value plus a half of the predetermined detection width, that is, (first threshold value+½ times (predetermined detection width)) of the inspection image are set to unprocessed. In other words, the predetermined pixel value of the inspection image is set to unprocessed (S20). Herein, the first threshold value and the predetermined detection width are stored in the threshold value storage 130.

As a method of setting the pixel value to unprocessed, there are, for example, a method of setting the pixel value to "null" and a method of setting the pixel value to "zero". The method of setting the pixel value to "zero" has a problem that it becomes unclear whether the pixel value was truly "zero" or whether the pixel value was set to "zero" because the pixel value was regarded as unprocessed. On the other hand, in the method of setting the pixel value to "null", it is obvious from the pixel value later that the pixel value was set to "null" because the pixel value was regarded as unprocessed. In this respect, it is preferable to set the pixel value to "null".

Next, a reference image is acquired (S22). As an example of a method for acquiring the reference image, the pattern generation circuit 111 reads the drawing data or the exposure image data from the memory device 109 through the control computer 110 and converts each figure pattern in each of the frame regions defined in the read drawing data or exposure image data to a multi-valued image data. This image data is transmitted to the reference circuit 112.

The figure defined in the drawing data or the exposure image data is, for example, a figure formed by using a rectangle or a triangle as a basic figure. Figure data defining a shape, a size, a position, and the like of each pattern figure by using, for example, the coordinate (x, y) at the reference position of the figure, lengths of sides, information such as a figure code as an identifier for distinguishing figure type such as a rectangle or a triangle is stored.

When the drawing data or the exposure image data to be the figure data is input to the pattern generation circuit 111, the data is generated to the data of each figure, and the figure code indicating the shape of the figure, the size of the figure, and the like of the figure data are interpreted. Then, multi-valued design image data is generated as a pattern arranged in a measure square having a grid having a predetermined quantization size as a unit and output. Then, when it is assumed that one pixel has a resolution of $\frac{1}{2}^8$ (=$\frac{1}{256}$), a small area of $\frac{1}{256}$ is allocated to the portion of the area of the figure arranged in the pixel to calculate the occupancy rate in the pixel. Then, an 8-bit occupancy rate data is output to the reference circuit 112.

Next, the reference circuit 112 performs an appropriate filtering process on the design image data which is the transmitted image data of the figure. In this manner, the reference image is generated.

In addition, the acquisition of the reference image (S22) may be performed before or in parallel to the mounting of the substrate on the stage (S12), the movement of the stage on the stage (S14), the irradiation of the electron beam (S16), and the acquisition of the inspection image (S20).

Next, by using the pixel value sum calculation circuit 136, the sum of the pixel values of the inspection image and the sum of the pixel values of the reference image are calculated (S24).

Next, the threshold value changing circuit 138 changes the first threshold value and the predetermined detection width on the basis of the sum of the pixel values of the inspection image and the sum of the pixel values of the reference image (S26). For example, in a case where the sum of the pixel values of the inspection image is two times the sum of the pixel values of the reference image, the first threshold value and the predetermined detection width are changed to ½ times or the like. In addition, for example, in a case where the sum of the pixel values of the inspection image is ⅓ of the sum of the pixel values of the reference image, the first threshold value and the predetermined detection width are changed to 3 times or the like. The changed first threshold value and the changed predetermined threshold value are stored in the threshold value storage 130.

In addition, without changing the first threshold value and the predetermined detection width, by using the pixel value conversion circuit 140, the sum of the pixel values of the reference image or the sum of the pixel values of the inspection image may be converted so that the sum of the pixel values of the inspection image and the sum of the pixel values of the reference image are equal to each other.

Next, by using the pixel value processing circuit 132, the pixel values equal to or less than a first threshold value minus a half of a predetermined detection width and the pixel values equal to or more than the first threshold value plus a half of the predetermined detection width of the reference image are set to unprocessed (S28). In other words, the predetermined pixel value of the reference image is set to unprocessed. If the first threshold value and the predetermined detection width are changed (S26), the changed first threshold value and the changed predetermined detection width are used.

Next, by using the difference image acquisition circuit 134, a difference image between the inspection image and the reference image is acquired (S30).

Next, the difference image inspection circuit 144 is used to inspect the defect on the basis of the difference image. Herein, in the inspection of defects, for example, in a case where a pixel value equal to or more than a second threshold value is detected, it may be determined that the pattern has a defect. Herein, it is preferable that the second threshold value is lower than the first threshold value. For example, the second threshold value may be stored in the threshold value storage 130.

FIGS. 5A to 5F are schematic diagrams illustrating the functions and effects of the pattern inspection method according to Comparative Example. The pattern being inspected is a line and space pattern.

FIG. 5A is a schematic diagram illustrating an example of the acquired inspection image. FIG. 5B is a schematic diagram illustrating an example of the reference image corresponding to the inspection image illustrated in FIG. 5A. FIG. 5C is a schematic diagram illustrating an example of the difference image between the inspection image illustrated in FIG. 5A and the reference image illustrated in FIG. 5B. FIG. 5D is a schematic diagram illustrating an example of the pixel value in a comparison portion of the inspection image illustrated in FIG. 5A. FIG. 5E is an example of the pixel value in the comparison portion of the reference image illustrated in FIG. 5B. FIG. 5F is an example of the pixel value in the comparison portion of the difference image illustrated in FIG. 5C.

In the inspection image of FIG. 5A, portions of adjacent lines of the line and space pattern are connected in the comparison portion. This connection is a defect. The reference image of FIG. 5B is an image of a line and space pattern having no connected portion. In the diagram of the pixel values in the comparison portion of the inspection image in FIG. 5D, two local maxima of pixel values illustrated in FIG. 5E are not observed at the distance between 200 and 300 corresponding to the defect of FIG. 5A.

Referring to the pixel values of the difference image in FIG. 5F, two local maxima of the pixel values are observed at the distance between 200 and 300. The defect is targeted in this detection. On the other hand, local maxima are also observed at the distance between 0 and 100 and the distance between 300 and 500. Since these local maxima are observed in the defect-free portion of the inspection image, it is determined that the defects were erroneously detected.

FIGS. 6A and 6B are schematic diagrams illustrating the functions and effects of the pattern inspection method according to the embodiment. The pattern being inspected is the same line and space pattern as in FIGS. 5A to 5F.

In FIG. 6A, the pixel values of (first threshold value−0.5×(predetermined detection width)) or less and the pixel values of (first threshold value+0.5×(predetermined detection width)) or more, as the pixel values in the comparison portion of the inspection image and the pixel values in the comparison portion of the reference image, respectively, are set to unprocessed.

In FIG. 6B, the pixel values in the comparison portion of the difference image are illustrated. A local maximum of pixel values exceeding the second threshold value was detected at the distance between 200 and 300. This is a defect that is targeted for detection. In addition, in FIG. 5F, the local maximum corresponding to the erroneous detection of the defect occurring at the distance between 0 and 100 and the distance between 300 and 500 is not detected in FIG. 6B. Therefore, it was possible to correctly detect the true defect by suppressing the erroneous detection of the defect by the pattern inspection method according to the embodiment.

Next, the functions and effects of the embodiment will be described.

FIGS. 7A and 7B are schematic diagrams of secondary electrons emitted from the pattern.

FIG. 7A is a schematic diagram of a pattern. FIG. 7B is a schematic diagram of secondary electrons emitted from the pattern illustrated in FIG. 7A.

The amount of secondary electrons emitted from a substance can be defined by a "diffusion region model". It can be assumed that secondary electrons are emitted from a portion of the diffusion region $A_1$ by irradiation with the first electron beam. In addition, it can be assumed that emitted from the secondary electrons are emitted from a portion of the diffusion region $A_2$ by irradiation with the second electron beam.

The diffusion region $A_1$ is formed at the end portion of the pattern. Therefore, the secondary electrons are emitted not only in the upper direction of the pattern but also in the lateral direction of the pattern.

On the other hand, the diffusion region $A_2$ is formed near the central portion of the pattern. In this case, even if the secondary electrons attempt to be emitted in the lateral direction of the pattern, the secondary electrons are absorbed in the pattern and cannot be emitted out of the pattern, so that the secondary electrons are emitted only in the upper direction of the pattern.

As a result, the amount of emitted secondary electrons is increased in the end portion of the pattern and is decreased in the central portion of the pattern. That is, the inspection image obtained by irradiating the pattern with the electron beam is an image in which the end portion of the pattern is bright and the other portions are dark.

The amount of secondary electrons emitted from the pattern is mainly determined by the material of the pattern, the shape of the pattern, and the parameters determined in the pattern inspection apparatus. Herein, the parameters determined in the pattern inspection apparatus are parameters such as the incident energy of the electron beam, the spot size of the electron beam, the scanning speed of the electron beams 20a to 20d, and the rate at which the emitted secondary electrons can be detected by the detection circuit 106.

As indicated by max in FIG. 7B, the amount of secondary electrons emitted from the end portion of the pattern is changed greatly with a slight change in the shape of the end portion of the pattern. For this reason, when the difference image between the reference image and the inspection image is generated, the difference value at the end portion is not stabilized, so that it is not appropriate to use the difference value for inspection.

The amount of secondary electrons emitted from the flat portion of the pattern varies according to shot noise based on the number of electrons irradiated by the electron beams 20a to 20d. Since the output change due to noise occurs at random, random signal change due to the shot noise is superimposed on the flat portion of the difference image obtained from the reference image and the inspection image, and thus, a pseudo defect exceeding the defect detection threshold value occurs. That is, the flat portion is easily affected by the shot noise.

Since the amount of secondary electrons emitted from the slope portion of the pattern is larger than the amount of secondary electrons emitted from the flat portion of the pattern, as the electron beam scans the slope portion as illustrated in FIGS. 7A and 7B, since the size of the electron beam is sufficiently small with respect to the pattern, the signal change sharply occurs. This signal change becomes shape information of the pattern in which the positions of the slope portion are illustrated with high accuracy, and the signal change is hardly affected by the shot noise. In addition, like the amount of secondary electrons emitted from the end portion of the pattern, the signal change does not greatly occur as the shape changes slightly. Therefore, the effect of the shot noise on the flat portion of the pattern is removed by setting the pixel values equal to or less than a first threshold value minus a half of a predetermined detection width to unprocessed. In addition, the effect of the shape change at the end portion of the pattern is removed by setting the pixel values equal to or more than the first threshold value plus a half of the predetermined detection width to unprocessed. Therefore, it is possible to provide the pattern inspection method and the pattern inspection apparatus capable of suppressing erroneous detection of defects.

In addition, as illustrated in the schematic diagram of the secondary electrons illustrated in FIG. 7B, considered is a method of determining the first threshold value and the predetermined detection width on the basis of the average ((max+min)/2) of the amount (denoted by max) of secondary electrons emitted from the end portion of the pattern and the amount (denoted by min) of secondary electrons emitted from the flat portion of the pattern. In addition, considered is a method of determining the first threshold value and the predetermined detection width on the basis of the detection amount "e" of the secondary electrons such that de/dx obtained by differentiating the detection amount "e" of the secondary electrons with the distance x becomes the maximum.

The method of determining that the pattern has a defect in a case where the difference image has a pixel value equal to or more than a second threshold value lower than the first threshold value is one of desirable methods of determining defects.

It is considered that the amount of secondary electrons is increased or decreased for reasons other than changing of the shape of the pattern by charging-up of the substrate or the like. Therefore, it is preferable that the first threshold value and the predetermined detection width are changed on the basis of the sum of the pixel values, or the sum of the pixel values of the reference image or the sum of the pixel values of the inspection image are converted (calculated) so that the sum of the pixel values of the inspection image and the sum of the pixel values of the reference image are equal to each other.

In the above description, a series of "circuits" includes processing circuits, and the processing circuits include an electric circuit, a computer, a processor, a circuit board, a quantum circuit, a semiconductor device, or the like. In addition, a common processing circuit (same processing circuit) may be used for each "circuit". Alternatively, different processing circuits (separate processing circuits) may be used. A program for executing a processor or the like may be recorded on a recording medium such as a magnetic disk device, a magnetic tape device, an FD, or a read only memory (ROM). In addition, a "memory unit", a "storage unit", or a memory device such as the "threshold value storage" include, for example, a recording medium such as a magnetic disk device, a magnetic tape device, an FD, a ROM (read only memory), or a solid state drive (SSD).

Heretofore, the embodiments of the invention have been described with reference to specific examples. The above-described embodiments are merely examples and do not limit the invention. In addition, the constituent elements of each embodiment may be appropriately combined.

In the embodiments, the configurations of the pattern inspection method and the pattern inspection apparatus, the manufacturing methods thereof, and the like, which are not directly necessary for the description of the invention are omitted in description. However, as necessary, the configuration of the charged particle beam inspection method may be appropriately selected and used. In addition, all the charged particle beam inspection methods that include the elements of the invention and can be appropriately changed in design by those skilled in the art are included in the scope of the invention. The scope of the invention is defined by the claims and their equivalents.

What is claimed is:

1. A pattern inspection method comprising:
   irradiating a substrate with an electron beam, a pattern being formed on the substrate;
   acquiring an inspection image as a secondary electron image of the pattern;
   setting a pixel value equal to or less than a first threshold value minus a half of a predetermined detection width of the inspection image and a pixel value equal to or more than the first threshold value plus a half of the predetermined detection width of the inspection image to unprocessed;
   acquiring a difference image between the inspection image having the pixel value equal to or less than the first threshold value minus the half of the predetermined detection width and the pixel value equal to or more than the first threshold value plus the half of the predetermined detection width being set to unprocessed and a reference image of the inspection image; and
   performing inspection on the basis of the difference image.

2. The pattern inspection method according to claim 1, further comprising, in the reference image, setting the pixel value equal to or less than a first threshold value minus a half of a predetermined detection width of the reference image and the pixel value equal to or more than the first threshold value plus the half of the predetermined detection width of the reference image to unprocessed.

3. The pattern inspection method according to claim 1, further comprising:
   calculating a first sum of the pixel values of the inspection image and a second sum of the pixel values of the reference image; and
   changing the first threshold value and the predetermined detection width on the basis of the first sum and the second sum.

4. The pattern inspection method according to claim 1, further comprising:
   calculating a first sum of the pixel values of the inspection image and a second sum of the pixel values of the reference image; and
   converting the first sum or the second sum so that the first sum and the second sum are equal to each other.

5. The pattern inspection method according to claim 1, wherein the performing step comprises determining that the pattern has a defect when the difference image has a particular pixel value equal to or more than a second threshold value lower than the first threshold value.

6. The pattern inspection method according to claim 1, further comprising setting the pixel value to unprocessed by setting the pixel value to zero.

7. The pattern inspection method according to claim 1, further comprising setting the pixel value to unprocessed by setting the pixel value to null.

8. A pattern inspection apparatus, comprising:
  an irradiator configured to irradiate a substrate with an electron beam, a pattern being formed on the substrate;
  an image acquisition mechanism configured to acquire an inspection image as a secondary electron image of the pattern;
  a pixel value processing circuit configured to set a pixel value equal to or less than a first threshold value minus a half of a predetermined detection width of the inspection image and a pixel value equal to or more than the first threshold value plus a half of the predetermined detection width of the inspection image to unprocessed;
  a difference image acquisition circuit configured to acquire a difference image between the inspection image having the pixel value equal to or less than the first threshold value minus the half of the predetermined detection width and the pixel value equal to or more than the first threshold value plus the half of the predetermined detection width being set to unprocessed and a reference image of the inspection image; and
  a difference image inspection circuit configured to perform inspection on the basis of the difference image.

9. The pattern inspection apparatus according to claim 8, wherein the pixel value processing circuit is further configured to set, in the reference image, the pixel value equal to or less than a first threshold value minus a half of a predetermined detection width of the reference image and the pixel value equal to or more than the first threshold value plus the half of the predetermined detection width of the reference image are set to unprocessed.

10. The pattern inspection apparatus according to claim 8, further comprising:
  a pixel value sum calculation circuit configured to calculate a first sum of the pixel values of the inspection image and a second sum of the pixel values of the reference image; and
  a threshold value changing circuit configured to change the first threshold value and the predetermined detection width on the basis of the first sum and the second sum.

11. The pattern inspection apparatus according to claim 8, further comprising:
  a pixel value sum calculation circuit configured to calculate a first sum of the pixel values of the inspection image and a second sum of the pixel values of the reference image; and
  a pixel value conversion circuit configured to convert the first sum or the second sum so that the first sum and the second sum are equal to each other.

12. The pattern inspection apparatus according to claim 8, wherein the difference image inspection circuit is further configured to determine that the pattern has a defect when the difference image has a particular pixel value equal to or more than a second threshold value lower than the first threshold value.

13. The pattern inspection apparatus according to claim 8, wherein the pixel value processing circuitry is further configured to set the pixel value to unprocessed by setting the pixel value to zero.

14. The pattern inspection apparatus according to claim 8, wherein the pixel value processing circuitry is further configured to set the pixel value to unprocessed by setting the pixel value to null.

15. The pattern inspection apparatus of claim 8, wherein the irradiator is an electron gun.

* * * * *